(12) United States Patent
Scheidt et al.

(10) Patent No.: US 7,079,653 B2
(45) Date of Patent: Jul. 18, 2006

(54) CRYPTOGRAPHIC KEY SPLIT BINDING PROCESS AND APPARATUS

(75) Inventors: Edward M. Scheidt, McLean, VA (US); C. Jay Wack, Clarksburg, MD (US)

(73) Assignee: Tecsec, Inc., Vienna, VA (US)

(*) Notice: Subject to any disclaimer, the term of this patent is extended or adjusted under 35 U.S.C. 154(b) by 798 days.

(21) Appl. No.: 10/147,433

(22) Filed: May 16, 2002

(65) Prior Publication Data

US 2003/0039358 A1    Feb. 27, 2003

Related U.S. Application Data

(63) Continuation-in-part of application No. 09/023,672, filed on Feb. 13, 1998, now Pat. No. 6,885,747.

(60) Provisional application No. 60/352,123, filed on Jan. 24, 2002.

(51) Int. Cl.
*H04L 9/14* (2006.01)
*H04L 9/24* (2006.01)

(52) U.S. Cl. .................. 380/258; 380/44; 380/46; 380/147; 380/264

(58) Field of Classification Search ............ 380/44, 380/46, 47, 258, 264, 277; 708/250, 254
See application file for complete search history.

(56) References Cited

U.S. PATENT DOCUMENTS

| | | | |
|---|---|---|---|
| 3,956,615 A | 5/1976 | Anderson et al. | 235/61.78 |
| 4,145,568 A | 3/1979 | Ehrat | 178/22 |
| 4,218,582 A | 8/1980 | Hellman et al. | 178/22 |
| 4,405,829 A | 9/1983 | Rivest et al. | 178/22.1 |
| 4,424,414 A | 1/1984 | Hellman et al. | 178/22.11 |
| 4,713,753 A | 12/1987 | Boebert et al. | 364/200 |
| 4,757,537 A | 7/1988 | Edelmann et al. | 380/51 |
| 4,864,616 A | 9/1989 | Pond et al. | 380/25 |
| 4,955,082 A | 9/1990 | Hattori et al. | 455/33 |
| 4,962,533 A | 10/1990 | Krueger et al. | 380/25 |
| 4,984,272 A | 1/1991 | McIlroy et al. | 380/25 |
| 5,052,040 A | 9/1991 | Preston et al. | 380/4 |
| 5,065,429 A | 11/1991 | Lang | 380/25 |
| 5,168,371 A * | 12/1992 | Takayanagi | 358/296 |
| 5,191,611 A | 3/1993 | Lang | 380/25 |
| 5,204,961 A | 4/1993 | Barlow | 395/725 |
| 5,222,018 A | 6/1993 | Sharpe et al. | 364/406 |

(Continued)

OTHER PUBLICATIONS

Bray, et al. (Eds.), "Extensible Markup Language (XML) 1.0." W3C Recommendations, Feb. 10, 1998, World Wide Web Consortium, www.w3.org/TR/1998/REC-xml-19980210.

(Continued)

*Primary Examiner*—Justin T. Darrow
(74) *Attorney, Agent, or Firm*—IP Strategies

(57) ABSTRACT

A cryptographic key split combiner includes a number of key split generators for generating cryptographic key splits from seed data, and a key split randomizer for randomizing the key splits to produce a cryptographic key. The key split generators can include a random split generator for generating random key splits, a token split generator for generating token key splits based on label data, a console split generator for generating console key splits based on maintenance data, a biometric split generator for generating biometric key splits based on biometric data, and a location split generator for generating location key splits based on location data. Label data can be read from storage, and can include user authorization data. A process for forming cryptographic keys includes randomizing or otherwise binding the splits to form the key.

69 Claims, 4 Drawing Sheets

U.S. PATENT DOCUMENTS

| | | | | |
|---|---|---|---|---|
| 5,276,738 | A | 1/1994 | Hirsch | 380/46 |
| 5,319,562 | A | 6/1994 | Whitehouse | 364/464.03 |
| 5,369,702 | A | 11/1994 | Shanton | 380/4 |
| 5,369,707 | A | 11/1994 | Follendore, III | 380/25 |
| 5,499,297 | A | 3/1996 | Boebert | 380/25 |
| 5,535,279 | A | 7/1996 | Seestrom | 380/55 |
| 5,541,994 | A | 7/1996 | Tomko et al. | 380/30 |
| 5,602,921 | A | 2/1997 | Ramadei | 380/51 |
| 5,627,894 | A | 5/1997 | Albert et al. | 380/46 |
| 5,664,177 | A * | 9/1997 | Lowry | 707/100 |
| 5,680,452 | A | 10/1997 | Shanton | 380/4 |
| 5,684,705 | A | 11/1997 | Herbert | 364/464.11 |
| 5,694,472 | A | 12/1997 | Johnson et al. | 380/25 |
| 5,696,829 | A | 12/1997 | Cordery et al. | 380/55 |
| 5,710,815 | A | 1/1998 | Ming et al. | 380/20 |
| 5,717,755 | A | 2/1998 | Shanton | 380/25 |
| 5,749,078 | A | 5/1998 | Gargiulo et al. | 705/404 |
| 5,751,808 | A | 5/1998 | Anshel et al. | 380/23 |
| 5,778,066 | A | 7/1998 | Shah et al. | 380/24 |
| 5,778,069 | A | 7/1998 | Thomlinson et al. | 380/25 |
| 5,794,234 | A | 8/1998 | Church et al. | 707/4 |
| 5,898,781 | A | 4/1999 | Shanton | 380/25 |
| 5,999,623 | A | 12/1999 | Bowman et al. | 380/20 |
| 6,055,634 | A | 4/2000 | Severwright | 713/164 |
| 6,105,012 | A | 8/2000 | Chang et al. | 705/64 |
| 6,169,805 | B1 | 1/2001 | Dunn et al. | 380/277 |
| 6,223,287 | B1 | 4/2001 | Douglas et al. | 713/178 |
| 6,385,552 | B1 | 5/2002 | Snyder | 702/123 |
| 2002/0150250 | A1 * | 10/2002 | Kitaya et al. | 380/277 |
| 2003/0084332 | A1 * | 5/2003 | Krasinski et al. | 713/200 |

OTHER PUBLICATIONS

Cover, "XML and Encryption." The SGML/XML Web Page, Nov. 8, 2000 or earlier, Organization for the Advancement of Structured Information Standards, www.oasis-open.org/cover/xmlAndEncryption.html.

Reagle, et al. (Eds.), "Draft Minutes." Minutes W3C XML-Encryption Workshop, Nov. 2, 2000 or earlier, World Wide Web Consortium, www.w3.org/2000/11/02-xml-encryption-ws/minutes.html.

Reagle, "XML Encryption Requirements." Apr. 20, 2001, World Wide Web Consortium, wwww.w3.org/TR/xml-encryption-req.html.

Reagle, "XML Encryption WG." Sep. 13, 2001 or earlier, World Wide Web Consortium, www.w3.org/Encryption/2001.

Dillaway, et al., "XML Encryption Syntax and Processing Version 1.0." Dec. 15, 2000, World Wide Web Consortium, lists.w3.org/Archives/Public/xml-encryption/2000Dec/att-0024/01-XMLEncryption_v01.html.

Imamura, et al. (Eds.), "Decryption Transform for XML Signature." Jun. 26, 2001, World Wide Web Consortium, www.w3.org/TR/2001/WD-xmlenc-decrypt-20010626.

Refnes, "Introduction to XML." XML 101, Aug. 28, 2001 or earlier, Internet.com, www.xmlfiles.com/xml/xml_intro.asp.

Refnes, "How can XML be used?" XML 101, Aug. 28, 2001 or earlier, Internet.com, www.xmlfiles.com/xml/xml_usedfor.asp.

Refnes, "XML Syntax." XML 101, Aug. 28, 2001 or earlier, Internet.com, www.xmlfiles.com/xml/xml_syntax.asp.

Refnes, "XML Attributes." XML 101, Aug. 28, 2001 or earlier, Internet.com, www.xmlfiles.com/xml/xml_attributes.asp.

Imamura, et al., "Specification of Element-wise XML Encryption." Aug. 2000, World Wide Web Consortium, lists.w3.org/Archives/Public/xml-encryption/2000Aug/att-0005/01-xmlenc-spec.html.

Garshol, "Re: XML, Links, and DTDs." Usenet: comp.text.sgml, Aug. 11, 1998.

Murphy, "Re: opionions [sic] needed: will XML help me for this?" Usenet: microsoft.public.xml, Oct. 5, 1998.

Massey, "An Introduction to Contemporary Cryptology." Proceedings of the IEEE, May 1998, pp. 533-549, vol. 76, No. 5.

Schneier, "Untangling Public-Key Cryptography." Dr. Dobb's Journal, May 1992, pp. 16-28.

* cited by examiner

CRYPTOGRAPHIC KEY SPLIT BINDING PROCESS AND APPARATUS

CROSS-REFERENCE TO RELATED PATENTS AND APPLICATIONS

This is a continuation-in-part of U.S. patent application Ser. No. 09/023,672, which was filed on Feb. 13, 1998 now U.S. Pat. No. 6,885,747, the disclosure of which is incorporated herein by reference. This also claims priority from U.S. Provisional Patent Application No. 60/352,123, which was filed on Jan. 24, 2002. This disclosure is related to the following issued U.S. Pat. No. 5,375,169, entitled "Cryptographic Key Management Method and Apparatus," which issued on Dec. 20, 1994 to SCHEIDT et al.; and U.S. Pat. No. 5,787,173, entitled "Cryptographic Key Management Method and Apparatus," which issued on Jul. 28, 1998 to SCHEIDT et al. This disclosure is also related to the following co-pending U.S. patent applications: Ser. No. 09/874,364, entitled "Cryptographic Key Split Combiner," which was filed on Jun. 6, 2001 by SCHEIDT et al.; Ser. No. 09/917,795, entitled "Cryptographic Key Split Combiner," which was filed on Jul. 31, 2001 by SCHEIDT et al.; Ser. No. 09/917,794, entitled "Cryptographic Key Split Combiner," which was filed on Jul. 31, 2001 by SCHEIDT et al.; Ser. No. 09/917,802, entitled "Cryptographic Key Split Combiner," which was filed on Jul. 31, 2001 by SCHEIDT et al.; Ser. No. 09/917,807, entitled "Cryptographic Key Split Combiner," which was filed on Jul. 31, 2001 by SCHEIDT et al.; Ser. No. 09/992,529, entitled "Cryptographic Key Split Binder for User with Tagged Data Elements," which was filed on Nov. 20, 2001 by SCHEIDT et al.; Ser. No. 09/205,221, entitled "Access Control and Authorization System," which was filed on Dec. 4, 1998 by SCHEIDT et al.; Ser. No. 09/388,195, entitled "Encryption Process Including a Biometric Input," which was filed on Sep. 1, 1999 by SCHEIDT; Ser. No. 09/418,806, entitled "Cryptographic Information and Flow Control," which was filed on Oct. 15, 1999 by WACK et al.; Ser. No. 09/936,315, entitled "Voice and Data Encryption Method Using a Cryptographic Key Split Combiner," which was filed on Sep. 10, 2001 by SCHEIDT; Ser. No. 10/035,817, entitled "Electronically Signing a Document," which was filed on Oct. 25, 2002 by SCHEIDT et al.; Ser. No. 10/060,039, entitled "Multiple Factor-Based User Identification and Authentication," which was filed on Jan. 30, 2002 by SCHEIDT et al.; and Ser. No. 10/060,011, entitled "Multiple Level Access System," which was filed on Jan. 30, 2002 by SCHEIDT et al.

FIELD OF THE INVENTION

The present invention relates to cryptographic systems. In particular, the present invention relates to a system for formulating cryptographic keys used to encrypt plaintext messages and decrypt ciphertext communications.

BACKGROUND OF THE INVENTION

In the modern world, communications are passed between parties in a variety of different ways utilizing many different communications media. Electronic communication is becoming increasingly popular as an efficient manner of transferring information, and electronic mail in particular is proliferating due to the immediacy of the medium.

Unfortunately, drawbacks accompany the benefits provided by electronic communication, particularly in the area of privacy. Electronic communications can be intercepted by unintended recipients. Wireless transmissions, such as voice communication by cellular telephone, and electronic mail are especially susceptible to such interception.

The problem of electronic communication privacy has been addressed, and solutions to the problem have been put in place. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the encrypt text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the decrypt text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to successfully decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

SUMMARY OF THE INVENTION

It is therefore an object of the present invention to provide a process and apparatus for assembling keys that provides added security against compromising a communication by unauthorized entities.

It is a further object of the present invention to provide a process and apparatus for developing key components that cannot be reproduced by unauthorized parties.

These and other objects and advantages are provided by a cryptographic key split binder, which includes a number of key split generators for generating cryptographic key splits and a key split randomizer for randomizing the cryptographic key splits to produce a cryptographic key. Each of the key split generators generates key splits from seed data.

The key split generators can include a location split generator for generating a location key split based on location seed data. The location seed data can be related to a geographic location, such as that of an intended recipient or simply one supplied by an intended recipient, for example. Alternatively, the location seed data can correspond to a non-geographic (or virtual) location, such as an Internet Protocol address (or "IP address") or Media Access Control address (or "MAC address"), for example. The location split generator can generate a key split based on both geographic location data and non-geographic location data. Alternatively, geographic location data and non-geographic location data can be used as bases of separate respective splits. This can be used as a way to specify a location at which someone in receipt of the ciphertext message is allowed to decrypt that message.

A location split generator includes at least one data line for receiving location seed data. According to the present invention, a data line is any medium by which data may be received. For example, a data line can be a terminal, a data bus, a signal line, a network cable, a contact, any electrical or optical conductor for receiving a signal or data, a port, a common computer interface, or any other structure across which the data can be transferred.

Thus, according to a particular aspect of the present invention, a cryptographic key split combiner includes a plurality of key split generators that each receive seed data and generate respective cryptographic key splits based on the seed data, and a key split randomizer that randomizes the cryptographic key splits to produce a cryptographic key. The plurality of key split generators includes a location split generator that receives location seed data and generates a location key split based on the location seed data. The location split generator can include at least one data line that receives the location seed data from a location device. The location seed data can be based at least in part on at least one of virtual location data, actual location data, and relative location data. The location seed data can correspond to at least one of virtual location data, actual location data, and relative location data. The location seed data can be based at least in part on at least one of Global Positioning System receiver output data and Galileo receiver output data. The location seed data can correspond to at least one of Global Positioning System receiver output data and Galileo receiver output data. The location seed data can be based at least in part on at least one of longitude, latitude, altitude, and satellite distance data. The location seed data can correspond to at least one of longitude, latitude, altitude, and satellite distance data. The location split generator can include memory that receives the location seed data from a geographic location device and stores the received location seed data. The memory can be, for example, a buffer or a latch. The location split generator can include at least one data line that receives the location seed data from a computer network. The location seed data can be based at least in part on a network location. The location seed data can correspond to a network location. The location seed data can be based at least in part on at least one of an Internet Protocol address and a Media Access Control address. The location seed data can correspond to at least one of an Internet Protocol address and a Media Access Control address. The location seed data can be based at least in part on network domain data. The location seed data can correspond to network domain data. The cryptographic key can be a stream of symbols. The cryptographic key can be at least one symbol block. The cryptographic key can be a key matrix. The plurality of key split generators can further include a random key split generator that generates a random split based on random seed data. The plurality of key split generators can further include an organization key split generator that generates an organization split based on organization seed data. The plurality of key split generators can further include a maintenance key split generator that generates a maintenance split based on maintenance seed data. The plurality of key split generators can further include a random split generator that generates a random split based on random seed data, an organization key split generator that generates an organization split based on organization seed data, and a maintenance key split generator that generates a maintenance split based on maintenance seed data. The present invention can also include the cryptographic key formed by the cryptographic key split combiner described above.

According to another aspect of the present invention, a process for forming cryptographic keys includes generating a plurality of cryptographic key splits, each based on seed data, and randomizing the cryptographic key splits to produce a cryptographic key. The action of generating a plurality of cryptographic key splits includes generating a location key split based on location seed data. The process can also include receiving the location seed data from a geographic location device. The location seed data can be based at least in part on at least one of virtual location data, actual location data, and relative location data. The location seed data can correspond to at least one of virtual location data, actual location data, and relative location data. The location seed data can be based at least in part on at least one of Global Positioning System receiver output data and Galileo receiver output data. The location seed data can correspond to at least one of Global Positioning System receiver output data and Galileo receiver output data. The location seed data can be based at least in part on at least one of longitude, latitude, altitude, and satellite distance data. The location seed data can correspond to at least one of longitude, latitude, altitude, and satellite distance data. The process can also include receiving the location seed data from a computer network. The location seed data can be based at least in part on a network location. The location seed data can correspond to a network location. The location seed data can be based at least in part on at least one of an Internet Protocol address and a Media Access Control address. The location seed data can correspond to at least one of an Internet Protocol address and a Media Access Control address. The location seed data can be based at least in part on network domain data. The location seed data can correspond to network domain data. The cryptographic key can be, for example, a stream of symbols, at least one symbol block, or a key matrix. The action of generating a plurality of cryptographic key splits can include generating a random key split based on random seed data. The action of generating a plurality of cryptographic key splits can include generating an organization key split based on organization seed data. The action of generating a plurality of cryptographic key splits can include generating a maintenance key split based on maintenance seed data. The action of generating a plurality of cryptographic key splits can include generating a random key split based on random seed data, generating an organization key split based on organization seed data, and generating a maintenance key split based on maintenance seed data. The present invention can also include the cryptographic key formed according to the process described above.

According to another aspect of the present invention, a storage medium includes instructions for causing a data processor to generate a cryptographic key. The instructions include generate a plurality of cryptographic key splits, each based on seed data, and randomize the cryptographic key splits to produce a cryptographic key. The instruction to generate a plurality of cryptographic key splits includes an instruction to generate a location key split based on location seed data. The instructions can further include an instruction to receive the location seed data from a geographic location device. The location seed data can be based at least in part on at least one of virtual location data, actual location data, and relative location data. The location seed data can correspond to at least one of virtual location data, actual location data, and relative location data. The location seed data can be based at least in part on at least one of Global Positioning System receiver output data and Galileo receiver output data. The location seed data can correspond to at least one of Global Positioning System receiver output data and Galileo receiver output data. The location seed data can be based at least in part on at least one of longitude, latitude, altitude, and satellite distance data. The location seed data can correspond to at least one of longitude, latitude, altitude, and satellite distance data. The instructions can further include an instruction to receive the location seed data from a computer network. The location seed data can be based at least in part on a network location. The location seed data can correspond to a network location. The location seed data can be based at least in part on at least one of an Internet Protocol address and a Media Access Control address. The location seed data can correspond to at least one of an Internet Protocol address and a Media Access Control address. The location seed data can be based at least in part on network domain data. The location seed data can correspond to network domain data. The cryptographic key can be, for example, a stream of symbols, at least one symbol block, or a key matrix. The instruction to generate a plurality of cryptographic key splits can include an instruction to generate a random key split based on random seed data. The instruction to generate a plurality of cryptographic key splits can include an instruction to generate an organization key split based on organization seed data. The instruction to generate a plurality of cryptographic key splits can include an instruction to generate a maintenance key split based on maintenance seed data. The instruction to generate a plurality of cryptographic key splits can include instructions to generate a random key split based on random seed data, to generate an organization key split based on organization seed data, and to generate a maintenance key split based on maintenance seed data. The present invention can also include the cryptographic key formed according to the instructions described above.

BRIEF DESCRIPTION OF THE DRAWINGS

The present invention will be more completely understood by way of the following detailed description, with reference to the following drawings wherein.

DETAILED DESCRIPTION OF THE INVENTION

Figure 1:
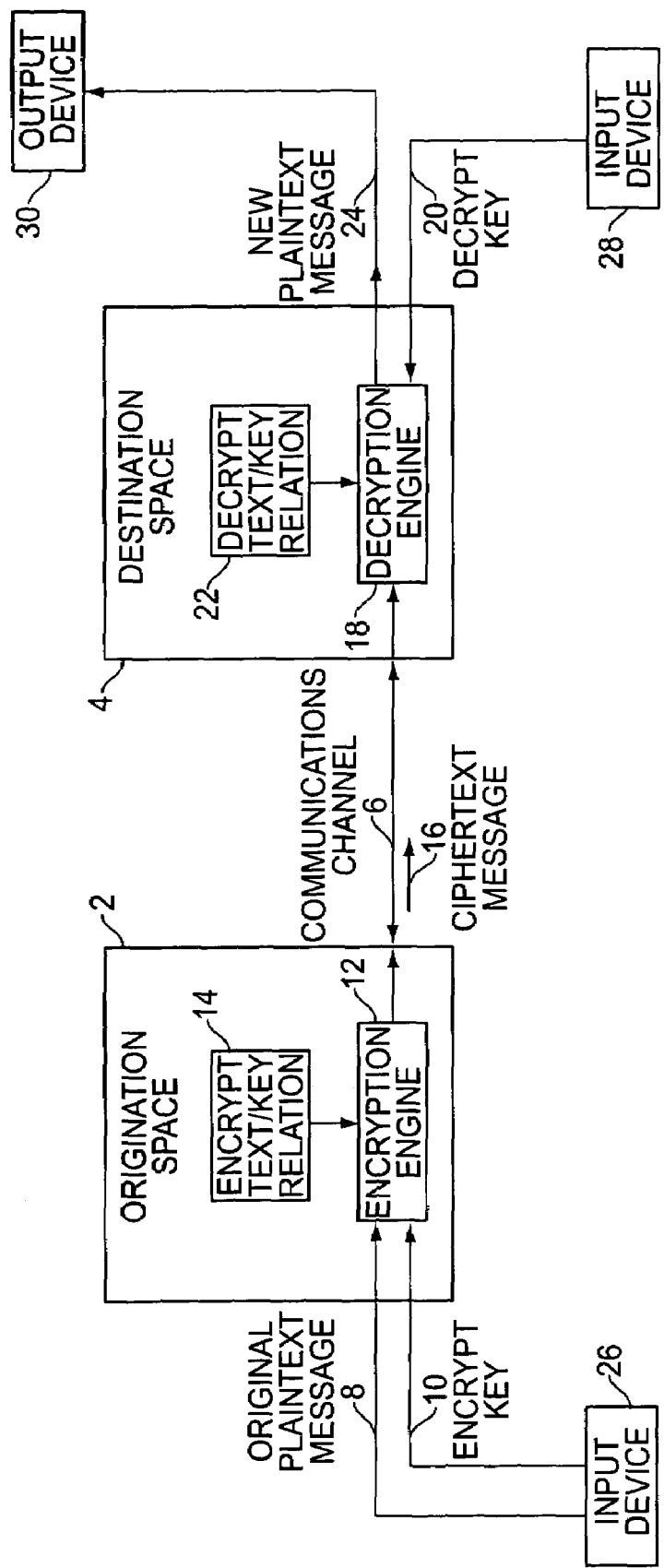
FIG. 1 is a block diagram of a communications event featuring cryptography.

Referring to FIG. 1, a communication has an origination space 2 and a destination space 4. The origination space 2 defines the place and time at which the communication originates. The destination space 4 defines the place and time at which the communication is intended to be decoded. The origination space 2 and the destination space 4 can be remote in location. Alternatively, they can be collocated but displaced in time. The space and time correspondence between the origination space 2 and the destination space 4 depends on the nature of a particular communication. The origination space 2 and destination space 4 are coupled to a common communications channel 6. This communications channel 6 can bridge a physical space, such as empty air in the case of a cellular voice telephone call. Alternatively, the communications channel 6 can be temporary storage for the communication while time passes between the origination space 2 and the destination space 4, such as a message left in memory on a computer by a first user, for a second user to read at a later time on the same computer. The communications channel 6 can also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer can have a certain amount of storage space in the form of memory for storing the text/key relation(s). A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, can also be provided to present the new plaintext message to the destination user. The text/key relation can be stored on a floppy disk or other permanent or temporary portable storage medium or token, rather than in hard storage in the computer, to allow different text/key relations to be applied by different users or in different situations.

Figure 2:
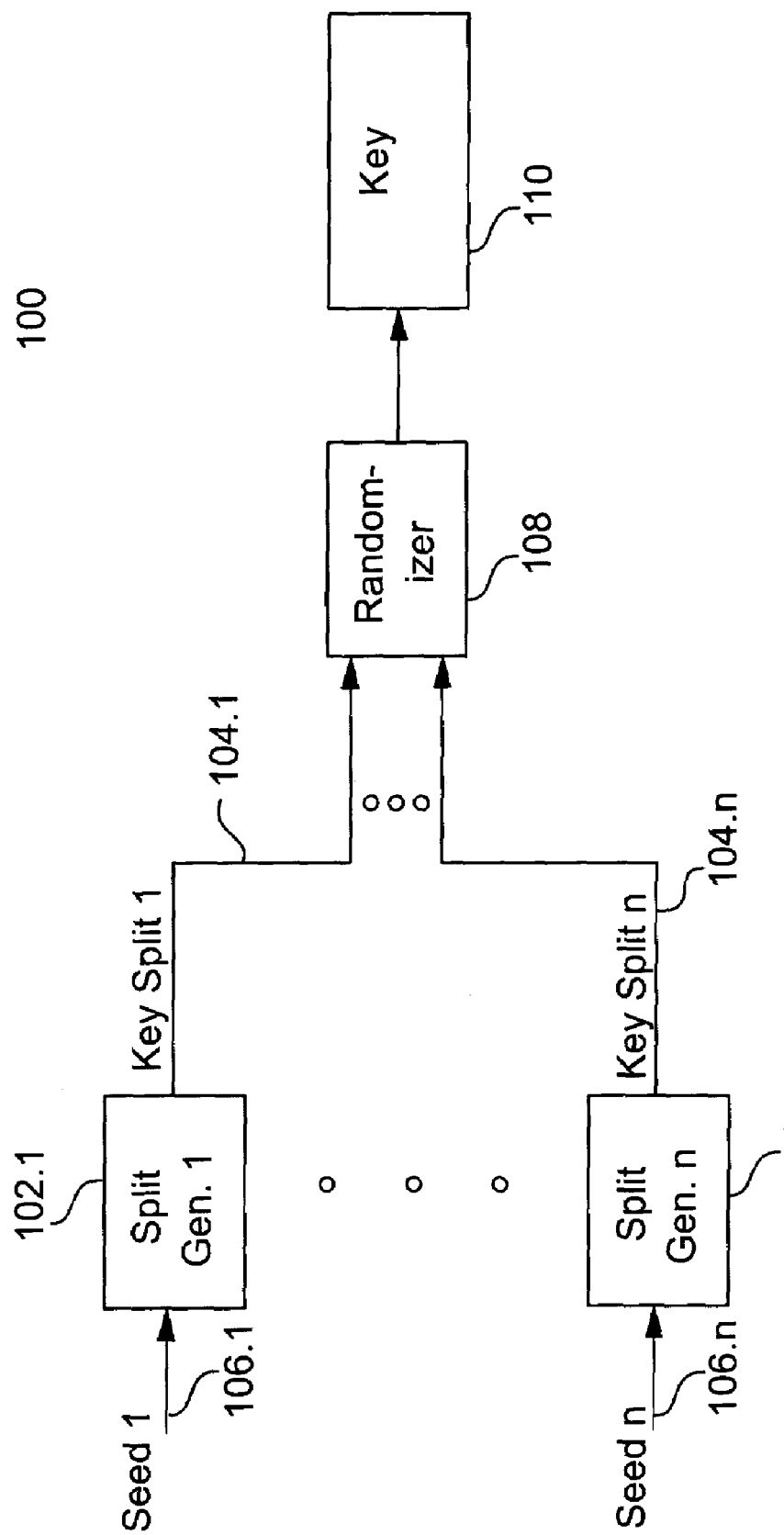
FIG. 2 is a block diagram of a general key split combiner according to the present invention.

The keys that are provided at the origination space and at the destination space can be composed of several components, or splits, each of which can be provided by a different source. As shown in FIG. 2, a general cryptographic key split combiner 100 according to the present invention includes a plurality of key split generators $102_1$–$102_n$ for generating cryptographic key splits $104_1$–$104_n$ from seed data $106_1$–$106_n$. A key split randomizer 108 randomizes the cryptographic key splits $104_1$–$104_n$ to produce the cryptographic key 110.

Figure 3:
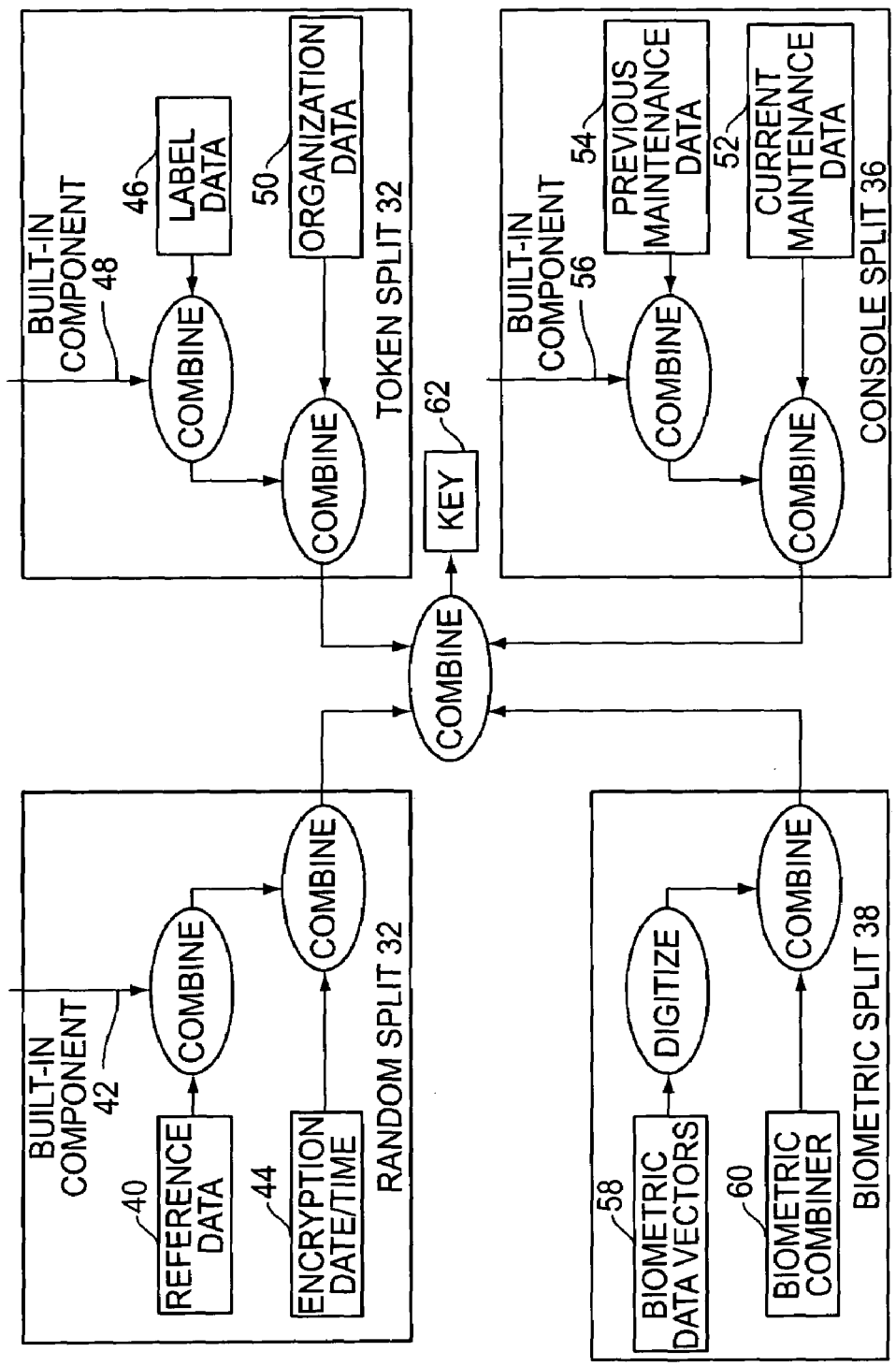
FIG. 3 is a block diagram of an exemplary key split combiner according to the present invention.

FIG. 3 is a block diagram of an exemplary embodiment of the key split combiner of the present invention, showing four particular key splits and the manner in which they are generated. As shown, a random key split 32 can be randomly or pseudo-randomly generated. A second split 34 can be stored on a token. A third split 36 can be stored on a console, and a fourth split 38 can be provided by a biometric source. The key splits can be combined to form a complete cryptographic key. This key can take the form of a stream of symbols, a group of symbol blocks, an N-dimensional key matrix, or any other form usable by the particular encryption scheme.

The random split 32 provides a random component to the cryptographic key. This split 32 is randomly or pseudo-randomly generated based on a seed that is provided by any source as reference data 40. For example, when a user attempts to log on to a system, the date and time of the user's log-on attempt, represented in digital form, can be used as a seed to generate the key split. That is, the seed can be provided to a pseudorandom sequence generator or other randomizer to produce the random split. Such pseudorandom sequence generators are well known in the art. For example, a simple hardware implementation can include a shift register, with various outputs of the register XORed and the result fed back to the input of the register. Alternatively, the seed can be combined, or randomized, with a built-in component 42, such as a fixed key seed stored at the origination space. The randomization can be performed, for example, by applying a variation of the text/key relation to the generated seed and the stored fixed key seed. This result can be further randomized with, for example, a digital representation of the date and time of the encryption 44, in order to produce the random key split 32.

The token split 34 can be generated in a similar fashion. In this case, the seed is provided on a token, that is, it is stored on a medium that is possessed by the user. For example, the seed can be stored on a floppy disk that the system must read as part of the encryption procedure. The token can store a number of different seeds, or label data 46, each of which corresponds to a different authorization provided by the system or specified by the user. For example, one seed can be used to generate a key split to authorize a particular user to read a message at a particular destination space. Another key seed can be used to generate a key split to authorize any member of a group of users to read a message at any destination space, and for one particular user to read the message and write over the message at a particular destination space. The label data 46 can even designate a window of time during which access to the communication is valid. This seed can be randomized with a built-in component 48, such as a seed stored at the origination space, which can then be further randomized with organization data 50 provided to the organization to which the user belongs.

The console split 36 is derived from a changing value stored at a user space, such as on a system console. Maintenance data, such as the checksum taken from a defragmentation table set, can be used to produce such changing values. For example, the current maintenance data 52 can be randomized with particular previous maintenance data. Alternatively, all previous maintenance data 54 can be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric samples of the user. For example, a retinal scanner can be used to obtain a unique retinal signature from the user. This information, in digital form, will then be used to generate the biometric split 38. This can be accomplished by, for example, randomizing a digital string corresponding to the biometric vectors 58 with biometric combiner data 60, which can be a digital hash of the user's system identification number or some other identifying data that can be linked to the user's physical data provided by the biometric reader. The resulting randomized data is the biometric split 38. The biometric split 38 provides information that is incapable of being reproduced by anyone but the user providing the biometric data vector 58.

The built-in key split components 42, 48, 56 described herein can be static in that they do not change based on uncontrolled parameters within the system. They can be updated for control purposes, however. For example, the built-in key split components 42, 48, 56 can be changed to modify the participation status of a particular user. The key split component can be changed completely to deny access to the user. Alternatively, only a single prime number divisor of the original key split component can be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

Once the key splits 32, 34, 36, 38 have been generated, they can be randomized together to produce the cryptographic key 62 for the communication. In performing each combination to generate the complete cryptographic key, a different variation of the text/key relation can be applied. The use of a plurality of different text/key relation variations adds to the security of the overall cryptographic scheme. It is contemplated that key splits other than those specifically described herein can be combined in forming the complete key 62. The total number of splits can also vary, and these splits can be used to build a key matrix to add to the complexity of the system. This complete key 62 should be in a form suitable for use in the particular cryptographic scheme. That is, different fields in the key can have different functions in the protocol of the communication, and should be arranged accordingly within the key.

At the destination space, the process is reversed in order to determine whether a user attempting to access a message has authorization, that is, has the valid key. The key supplied by the user at the destination space must include information required by the labels that were used to create the token split at the origination space. This information can also take the form of a token split. Further, a biometric split can be required as part of the destination key, in order to provide a link between assigned identification data for the user and physical data collected from the user biometrically. The token split and the biometric split can be combined with other splits at the destination space to form the complete destination key.

Figure 4:
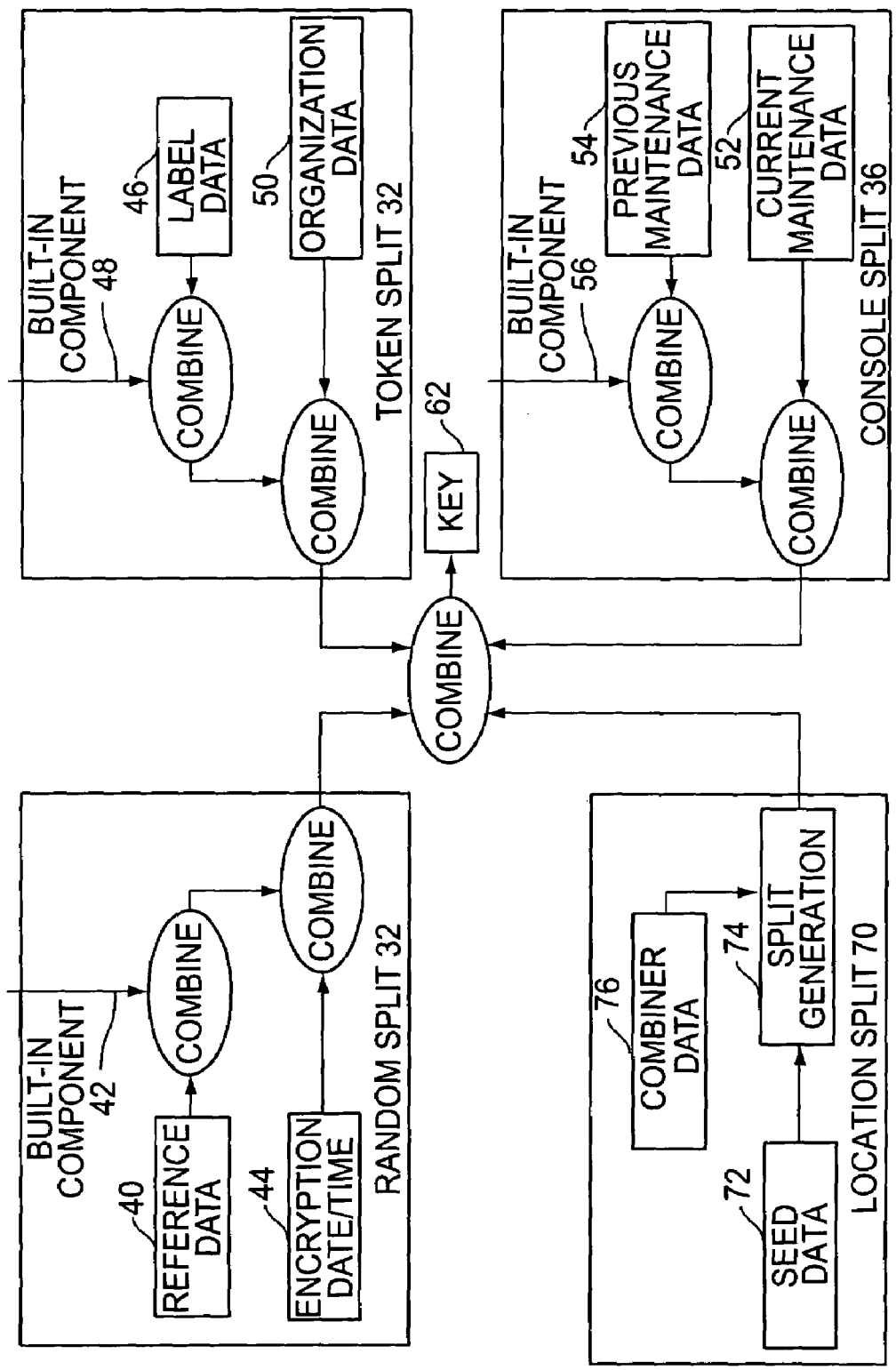
FIG. 4 is a block diagram of an exemplary key split combiner including a location key split according to the present invention.

FIG. 4 is a block diagram of another exemplary embodiment of the present invention. This embodiment includes a location key split 70, which in this particular embodiment is a geographic location split 70. For purposes of illustration, the exemplary embodiment also includes the random key split 32, the token key split 34, and the console key split 36 described previously.

The location split 70 is generated from geographic location seed data 72 provided by the sender of the message at the transmit space, and by a geographic location receiver at the receive space. For example, the sender provides geographical information regarding the intended recipient(s) of the message. In the case of a message to be stored on a computer and later read by the intended recipient on the same computer at the same location, or transmitted to an intended recipient, to be accessed on a different computer at the same location (such as on a laptop or personal data assistant), the sender can receive the geographic location information via a geographic location receiver. This information, in digital form, will then be used to generate the geographic location split 70. This can be accomplished by, for example, randomizing a digital string corresponding to the geographic information 72 with geographic combiner data 76. The resulting randomized data is the geographic location split 70. The geographic location split 70 provides information that is incapable of being reproduced by anyone anywhere but at the specified geographical location.

The geographical information can be formatted according to standard geographic data protocols, such as GPS and Galileo. Alternatively, a proprietary geographic location protocol can be used, to lessen the likelihood that an interloper can interpret and spoof the underlying geographic information.

Location restrictions need not be limited to geographical location. As an alternative, or additionally, a virtual location can be the basis for a location split. In this way, an accessing user's location can be restricted to a particular computer, any computer connected to a particular server, a node, a particular e-mail address, or any virtual location that can be specified by data serving as an address, such as an IP address.

Once the key splits 32, 34, 36, 70 have been generated, they can be randomized together, or otherwise bound, to produce the cryptographic key 62 for the communication. In performing each combination to generate the complete cryptographic key, a different variation of the text/key relation can be applied. The use of a plurality of different text/key relation variations adds to the security of the overall cryptographic scheme. As noted earlier, this location data can be related to the geographic location of the recipient. Alternatively, or additionally, the location information can be related to a location of the recipient that is non-geographic in nature, such as a node on a network. A geographic location and a non-geographic location can be the basis of separate respective key splits, or the data related to both types of locations can be used to form a location split together.

At the destination space, the process is reversed in order to determine whether a user attempting to access a message has authorization, that is, has the valid key. In the case of the embodiment of FIG. 4, the receiver at the destination space must provide the location data necessary to recreate the location key split in order to form the proper key. The key supplied by the user at the destination space must include the location information that was used to create the location split at the origination space. This information can also take the form of a location split at the destination space. The location split can be combined with any other splits at the destination space to form the complete destination key.

The invention has been described using exemplary and preferred embodiments. However, the scope of the present invention is not limited to these particular disclosed embodiments. To the contrary, the present invention is contemplated to encompass various modifications and similar arrangements. The scope of the claims, therefore, should be accorded the broadest interpretation so as to include all such modifications and similar arrangements.

What is claimed is:

1. A cryptographic key split combiner, comprising:
a plurality of key split generators that each receive seed data and generate respective cryptographic key splits based on the seed data; and
a key split randomizer that randomizes the cryptographic key splits to produce a cryptographic key;
wherein said plurality of key split generators includes a location split generator that receives location seed data and generates a location key split based on the location seed data.

2. The cryptographic key split combiner of claim 1, wherein the location split generator includes at least one data line that receives the location seed data from a location device.

3. The cryptographic key split combiner of claim 2, wherein the location seed data is based at least in part on at least one of virtual location data, actual location data, and relative location data.

4. The cryptographic key split combiner of claim 2, wherein the location seed data corresponds to at least one of virtual location data, actual location data, and relative location data.

5. The cryptographic key split combiner of claim 2, wherein the location seed data is based at least in part on at least one of Global Positioning System receiver output data and Galileo receiver output data.

6. The cryptographic key split combiner of claim 2, wherein the location seed data corresponds to at least one of Global Positioning System receiver output data and Galileo receiver output data.

7. The cryptographic key split combiner of claim 2, wherein the location seed data is based at least in part on at least one of longitude, latitude, altitude, and satellite distance data.

8. The cryptographic key split combiner of claim 2, wherein the location seed data corresponds to at least one of longitude, latitude, altitude, and satellite distance data.

9. The cryptographic key split combiner of claim 1, wherein the location split generator includes memory that receives the location seed data from a geographic location device and stores the received location seed data.

10. The cryptographic key split combiner of claim 9, wherein the memory is a buffer.

11. The cryptographic key split combiner of claim 9, wherein the memory is a latch.

12. The cryptographic key split combiner of claim 1, wherein the location split generator includes at least one data line that receives the location seed data from a computer network.

13. The cryptographic key split combiner of claim 12, wherein the location seed data is based at least in part on a network location.

14. The cryptographic key split combiner of claim 12, wherein the location seed data corresponds to a network location.

15. The cryptographic key split combiner of claim 13, wherein the location seed data is based at least in part on at least one of an Internet Protocol address and a Media Access Control address.

16. The cryptographic key split combiner of claim 13, wherein the location seed data corresponds to at least one of an Internet Protocol address and a Media Access Control address.

17. The cryptographic key split combiner of claim 13, wherein the location seed data is based at least in part on network domain data.

18. The cryptographic key split combiner of claim 13, wherein the location seed data corresponds to network domain data.

19. The cryptographic key split combiner of claim 1, wherein the cryptographic key is a stream of symbols.

20. The cryptographic key split combiner of claim 1, wherein the cryptographic key is at least one symbol block.

21. The cryptographic key split combiner of claim 1, wherein the cryptographic key is a key matrix.

22. The cryptographic key split combiner of claim 1, wherein said plurality of key split generators further include a random key split generator that generates a random split based on random seed data.

23. The cryptographic key split combiner of claim 1, wherein said plurality of key split generators further include an organization key split generator that generates an organization split based on organization seed data.

24. The cryptographic key split combiner of claim 1, wherein said plurality of key split generators further include a maintenance key split generator that generates a maintenance split based on maintenance seed data.

25. The cryptographic key split combiner of claim 1, wherein said plurality of key split generators further include a random split generator that generates a random split based on random seed data, an organization key split generator that generates an organization split based on organization seed data, and a maintenance key split generator that generates a maintenance split based on maintenance seed data.

26. A process for forming cryptographic keys, comprising:
generating a plurality of cryptographic key splits, each based on seed data; and
randomizing the cryptographic key splits to produce a cryptographic key;
wherein generating a plurality of cryptographic key splits includes generating a location key split based on location seed data.

27. The process of claim 26, further comprising receiving the location seed data from a geographic location device.

28. The process of claim 26, wherein the location seed data is based at least in part on at least one of virtual location data, actual location data, and relative location data.

29. The process of claim 26, wherein the location seed data corresponds to at least one of virtual location data, actual location data, and relative location data.

30. The process of claim 26, wherein the location seed data is based at least in part on at least one of Global Positioning System receiver output data and Galileo receiver output data.

31. The process of claim 26, wherein the location seed data corresponds to at least one of Global Positioning System receiver output data and Galileo receiver output data.

32. The process of claim 26, wherein the location seed data is based at least in part on at least one of longitude, latitude, altitude, and satellite distance data.

33. The process of claim 26, wherein the location seed data corresponds to at least one of longitude, latitude, altitude, and satellite distance data.

34. The process of claim 26, further comprising receiving the location seed data from a computer network.

35. The process of claim 26, wherein the location seed data is based at least in part on a network location.

36. The process of claim 26, wherein the location seed data corresponds to a network location.

37. The process of claim 26, wherein the location seed data is based at least in part on at least one of an Internet Protocol address and a Media Access Control address.

38. The process of claim 26, wherein the location seed data corresponds to at least one of an Internet Protocol address and a Media Access Control address.

39. The process of claim 26, wherein the location seed data is based at least in part on network domain data.

40. The process of claim 26, wherein the location seed data corresponds to network domain data.

41. The process of claim 26, wherein the cryptographic key is a stream of symbols.

42. The process of claim 26, wherein the cryptographic key is at least one symbol block.

43. The process of claim 26, wherein the cryptographic key is a key matrix.

44. The process of claim 26, wherein generating a plurality of cryptographic key splits further includes generating a random key split based on random seed data.

45. The process of claim 26, wherein generating a plurality of cryptographic key splits further includes generating an organization key split based on organization seed data.

46. The process of claim 26, wherein generating a plurality of cryptographic key splits further includes generating a maintenance key split based on maintenance seed data.

47. The process of claim 26, wherein generating a plurality of cryptographic key splits further includes generating a random key split based on random seed data, generating an organization key split based on organization seed data, and generating a maintenance key split based on maintenance seed data.

48. A storage medium comprising instructions for causing a data processor to generate a cryptographic key, wherein the instructions include:
generate a plurality of cryptographic key splits, each based on seed data; and
randomize the cryptographic key splits to produce a cryptographic key;
wherein generate a plurality of cryptographic key splits includes generate a location key split based on location seed data.

49. The storage medium of claim 48, wherein the instructions further include receive the location seed data from a geographic location device.

50. The storage medium of claim 48, wherein the location seed data is based at least in part on at least one of virtual location data, actual location data, and relative location data.

51. The storage medium of claim 48, wherein the location seed data corresponds to at least one of virtual location data, actual location data, and relative location data.

52. The storage medium of claim 48, wherein the location seed data is based at least in part on at least one of Global Positioning System receiver output data and Galileo receiver output data.

53. The storage medium of claim 48, wherein the location seed data corresponds to at least one of Global Positioning System receiver output data and Galileo receiver output data.

54. The storage medium of claim 48, wherein the location seed data is based at least in part on at least one of longitude, latitude, altitude, and satellite distance data.

55. The storage medium of claim 48, wherein the location seed data corresponds to at least one of longitude, latitude, altitude, and satellite distance data.

56. The storage medium of claim 48, wherein the instructions further include receive the location seed data from a computer network.

57. The storage medium of claim 48, wherein the location seed data is based at least in part on a network location.

58. The storage medium of claim 48, wherein the location seed data corresponds to a network location.

59. The storage medium of claim 48, wherein the location seed data is based at least in part on at least one of an Internet Protocol address and a Media Access Control address.

60. The storage medium of claim 48, wherein the location seed data corresponds to at least one of an Internet Protocol address and a Media Access Control address.

61. The storage medium of claim 48, wherein the location seed data is based at least in part on network domain data.

62. The storage medium of claim 48, wherein the location seed data corresponds to network domain data.

63. The storage medium of claim 48, wherein the cryptographic key is a stream of symbols.

64. The process of claim 48, wherein the cryptographic key is at least one symbol block.

65. The process of claim 48, wherein the cryptographic key is a key matrix.

66. The storage medium of claim 48, wherein generate a plurality of cryptographic key splits further includes generate a random key split based on random seed data.

67. The storage medium of claim 48, wherein generate a plurality of cryptographic key splits further includes generate an organization key split based on organization seed data.

68. The storage medium of claim 48, wherein generate a plurality of cryptographic key splits further includes generate a maintenance key split based on maintenance seed data.

69. The storage medium of claim 48, wherein generate a plurality of cryptographic key splits further includes generate a random key split based on random seed data, generate an organization key split based on organization seed data, and generate a maintenance key split based on maintenance seed data.

\* \* \* \* \*